UNITED STATES PATENT OFFICE.

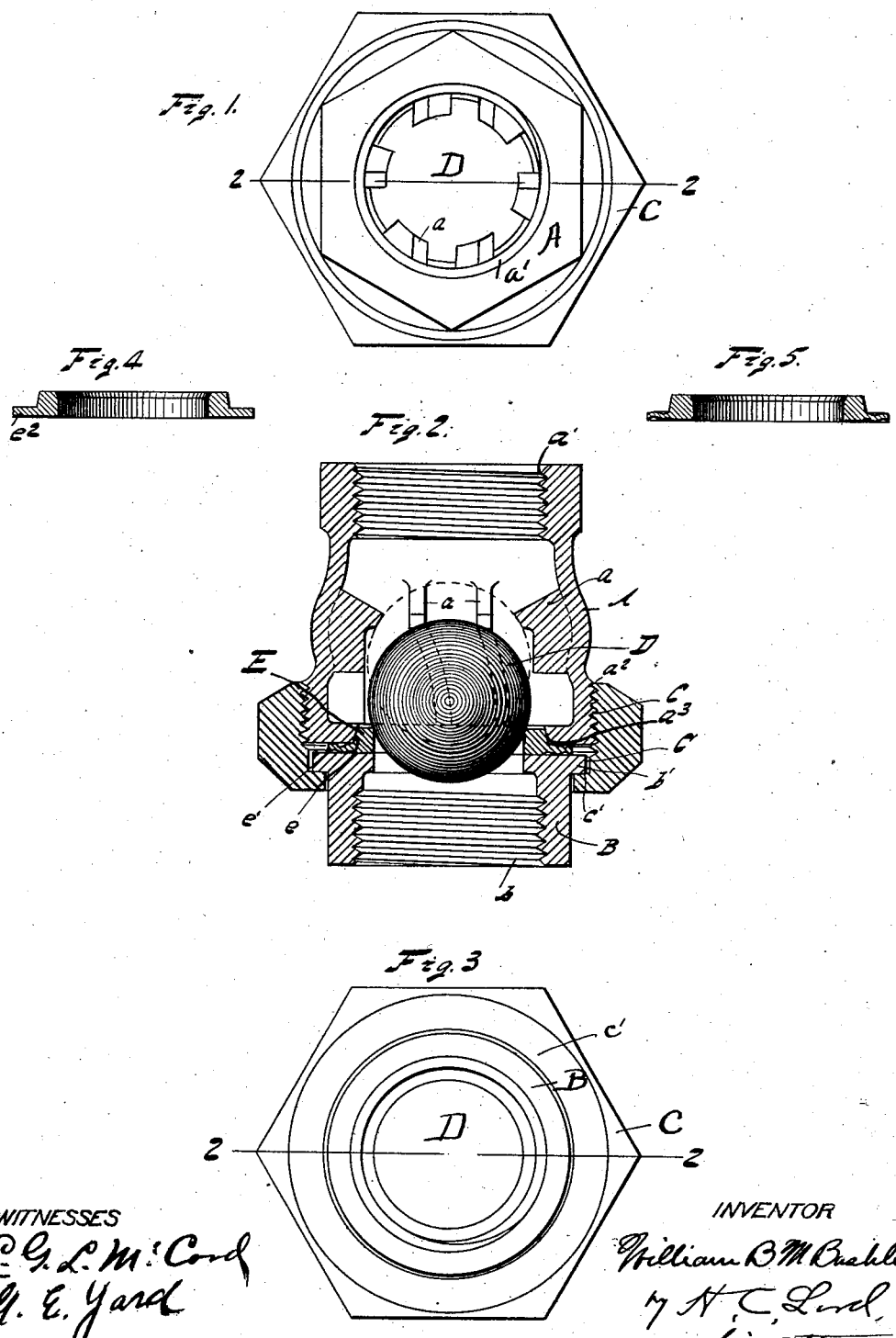

WILLIAM B. M. BASHLIN, OF WARREN, PENNSYLVANIA, ASSIGNOR TO THE BASHLIN COMPANY, OF WARREN, PENNSYLVANIA.

CHECK-VALVE.

SPECIFICATION forming part of Letters Patent No. 720,100, dated February 10, 1903.

Application filed February 25, 1902. Serial No. 95,513. (No model.)

*To all whom it may concern:*

Be it known that I, WILLIAM B. M. BASHLIN, a citizen of the United States, residing at Warren, in the county of Warren and State of Pennsylvania, have invented certain new and useful Improvements in Check-Valves; and I do hereby declare the following to be a full, clear, and exact description of the invention, such as will enable others skilled in the art to which it appertains to make and use the same.

This invention relates to check-valves; and it consists in certain improvements in the construction thereof, as will be hereinafter fully described, and pointed out in the claims.

The invention is illustrated in the accompanying drawings, as follows:

Figure 1 is a top view of the valve as shown in Fig. 2. Fig. 2 is a section on the lines 2 2 in Figs. 1 and 3. Fig. 3 is a bottom view of the valve as shown in Fig. 2. Fig. 4 shows an alternative construction of the valve-seat and packing-ring. Fig. 5 shows the preferred construction of the valve-seat and packing-ring.

This check-valve is peculiarly adapted, except as to the means of rotating the valve, to a union-joint and is so shown and claimed. This comprises the body A, having the screw-thread $a'$ for connecting with the pipe and the screw-thread $a^2$ for the nut C of the union-joint. The nut C is provided with an internal thread $c$ for engaging the thread $a^2$ and the flange-shoulder $c'$ for engaging the hub B in the usual manner. The hub B is provided with the internal screw-thread $b$ for connecting with the pipe. The hub is also provided with the usual annular shoulder $b'$, which is engaged by the flange $c'$. The body is provided with the guides or contact-pieces $a$, and within the cage formed between these pieces and the hub B is placed the valve device—as shown the ball D. The contact-pieces $a$, being arranged on a slant or spiral to the direction of movement of the ball, rotate the ball as it reciprocates when being opened and closed, so that the position of the ball is constantly changed, thus making it wear evenly.

I prefer to provide the removable seat E, having the flange $e'$, which forms the packing for the union-joint. This flange also holds the seat in place. The seat has the beveled shoulder $e$, which fits in the beveled groove $a^3$ in the body. By making this beveled the seat can be readily removed when desired. With this construction by a very little additional expense a union may be formed into a check-valve with a removable seat. The spiral contact-pieces of course are applicable to any check-valve. I prefer that the flange $e'$ should be corrugated; but the flange may be formed as the flange $e^2$ in Fig. 4.

What I claim as new is—

1. In a check-valve, the combination of the body, hub and nut forming a union-joint; a valve device arranged in one of the parts of the union; and a seat for the valve having a flange forming a packing for the union.

2. In a check-valve, the combination of the body, hub and nut forming a union-joint; a valve device arranged in the body of the union; a seat for the valve having a flange forming a packing for the union, said seat being locked in place by the assembling of the joint.

3. In a check-valve, the combination of the body, hub and nut forming a union-joint; a valve device arranged in one of the parts of the union; and a seat for the valve having a corrugated flange forming a packing for the union.

4. A check-valve comprising a ball-valve, and contact-pieces arranged at a slant or spiral to the direction of movement of the ball-valve to rotate said ball-valve.

5. In a check-valve, the combination of the body A; the hub B, having the shoulder $b'$; the nut C, screwed on the body portion and having the flange $c'$, for engaging the shoulder $b'$; the seat E, engaged by the body and hub and forming a packing between said parts; and the ball-valve D, arranged in the body portion and operating upon said seat.

6. In a check-valve, the combination of the body A, having the spirally-disposed contact-pieces $a$, and a beveled groove $a^3$; the ball-valve device D, arranged within said contact-pieces; the nut C, having the shoulder $c'$; the hub B, having the shoulder $b'$ engaged by the shoulder $c'$; the seat E, having the beveled shoulder $e$, fitting in the groove $a'$; and the corrugated flange between the hub and the body of the union.

In testimony whereof I affix my signature in presence of two witnesses.

WILLIAM B. M. BASHLIN.

Witnesses:
JUSTIN P. SLOCUM,
H. C. LORD.